United States Patent [19]
Egli et al.

[11] 3,879,135
[45] Apr. 22, 1975

[54] PHOTOMETER CIRCUITRY FOR THE DIGITAL INDICATION OF THE LIGHT ABSORPTION OF A TEST SAMPLE AND FOR AUTOMATICALLY OBTAINING NULL BALANCE

[75] Inventors: Bruno Egli, Rorschach; Niklaus Manser, Goldach, both of Switzerland

[73] Assignee: Labtronic, AG

[22] Filed: Apr. 24, 1973

[21] Appl. No.: 353,965

[30] Foreign Application Priority Data
Apr. 25, 1972 Germany............................ 2220231
Apr. 25, 1972 Germany............................ 2220230

[52] U.S. Cl. ............... 356/206; 356/222; 356/229; 250/565
[51] Int. Cl. .......................... G01n 21/22; G01j 1/42
[58] Field of Search .......... 356/229, 201, 204, 206, 356/208, 222, 226, 88; 250/564, 565

[56] References Cited
UNITED STATES PATENTS
| | | | |
|---|---|---|---|
| 2,722,156 | 11/1955 | Warren | 356/222 |
| 2,804,549 | 8/1957 | Warren | 356/88 |
| 3,416,865 | 12/1968 | Townsend | 356/206 |

*Primary Examiner*—Ronald L. Wibert
*Assistant Examiner*—Conrad Clark
*Attorney, Agent, or Firm*—Andrus, Sceales, Starke & Sawall

[57] ABSTRACT

In a photometer a reference signal and a signal responsive to the light transmission properties of a test sample are established. Amplifiers expand the difference between the signals to improve measurement accuracy. The signals are then equalized by incrementally increasing one signal by means of a digital-analog converter. The number of such increments necessary to produce the null balance condition, as recorded in a binary counter, is an indication of the absorption properties of the sample.

9 Claims, 4 Drawing Figures

PHOTOMETER CIRCUITRY FOR THE DIGITAL INDICATION OF THE LIGHT ABSORPTION OF A TEST SAMPLE AND FOR AUTOMATICALLY OBTAINING NULL BALANCE

BACKGROUND OF THE INVENTION - FIELD OF THE INVENTION

The present invention is directed to for providing a digital indication of the light absorption circuitry for the automatic null balancing of a photometer.

BACKGROUND OF THE INVENTION - SUMMARY

In known photometers a light beam is passed through a test sample in a glass cuvette or test cell and applied to a photoelectric sensor. The photoelectric sensor provides a voltage in accordance with the light absorbance of the test sample which is used for readout purposes.

An object of the present invention is to provide a null balance photometer capable of fully automatic electronic operation responsive to the introduction of a test sample in the instrument. The photometer requires no adjustment by hand or motive power means to be effective. According to pressure on a push button and the simultaneous flashing of the lamp and introduction of the test sample, and subsequent extinguishment of the lamp and release of the push button, the null point may be exactly ascertained in approximately two seconds. It is a further object of the invention that the optical properties of a blank solution may be registered or stored in the apparatus so that subsequent test values may be automatically referenced to the stored values of the blank solution.

To accomplish the foregoing purposes, the present invention provides a technique for photometers for digitally indicating the light absorption properties of a test sample in a cuvette.

As criteria for the light transmission properties of the analyzed sample, the relationship of the quantity of the light applied to the sample to the quantity of light emerging from the sample will thus be employed. For this purpose a comparison light beam will be generated which is proportional to the intensity of the light rays applied to the cuvette. It is preferable in order not to diminish the useful intensity of the light rays which are applied to the analysis sample to divert only a small part of the light quantity in the generation of the comparison ray. By sufficiently high amplification with an amplifier, a signal which corresponds to the light intensity applied to the cuvette may be obtained. A measuring sensor, for example, a photoelectric sensor senses the light transmitted through the analysis sample.

In a known way, through a backing device, a comparison light beam will be split before the cuvette with the test sample. The comparison light beam illuminates a photoelectric cell to provide a voltage which is amplified proportional to the intensity of the light beam applied to the cuvette. The test sample in the cuvette is illuminated and the intensity thereof related to the intensity of the comparison light beam. The light emerging from the cuvette does not contain the portion absorbed in the test sample. A voltage produced by the emerging light is led to an amplifier in a manner similar to that produced by the comparison light beam.

The principle of the null balance is that the two electrical quantities of the comparison light beam and the light beam through the cuvette, i.e., through the test sample, will be equalized with the help of amplification. Under these conditions, when a like electrical size of the comparison and test light beams has been accomplished, one has a clearly defined end point, for example, null balance, of the test sample, from which measurements can be begun.

To the purpose, amplifiers are provided which receive the electrical quantities of the measure and comparison rays with minimum amplification level. Through a balance logic, the amplification is step wise raised in magnitude, for example, by means of a field effect transistor as an electronic switching means which is arranged in the feedback path of the amplifiers, until the signals have reached a sufficient level. The signal of the measure channel will thereby, through the coarse regulation, be brought to a somewhat higher value than the signal in the comparison channel. A comparator, which compares the signals on the output, stops the coarse adjustment and commences the fine adjustment of electrical size. The fine regulation of signal size is in the comparison channel effected and occurs by means of a binary counter which finely increases signal size by means of a diigital-analog converter in small steps with a frequency of 20 kilohertz.

When the two output signals of the measuring and comparison channels are of like size, the null comparison is ended, whereby upon a number readout of the null in the binary counter will be observed.

This comparison occurs fully automatically and very quickly. The comparison is electronically set in operation by engaging a sample and pressing a key. In approximately two seconds duration, the null comparison results and the readout number shows the null value digitally. An advantage of the photometer of the present invention is that the necessary counting of the steps for coarse and fine comparison will be stored therein. The optical qualities of a blank solution may thus be registered in the apparatus so that the following measured values will automatically be referred to the registered blank values.

DESCRIPTION OF THE PREFERRED EMBODIMENT

Figure 1:
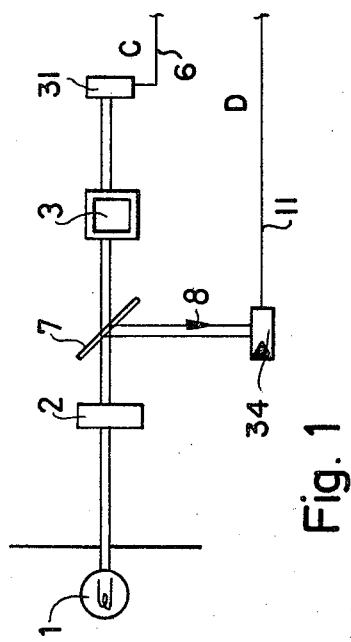
FIG. 1 is a simplified schematic diagram showing the generation of the light beam and corresponding voltage signals.

Turning now to FIG. 1, light source 1, which may, for example, be a mercury lamp, provides a beam of light. The light passes through filter 2 and strikes partially transparent mirror 7. A sizable portion of the light passes through mirror 7. This portion is applied to cuvette 3 containing the fluid samples to be analyzed. The fluid partially absorbs the light, providing an indication of its properties, and the emerging light from the cuvette is received by photoelectric cell 31. The output signal in conductor 6 from photocell 31, which is subjected to electronic analysis, may hereinafter be termed Signal C.

The reflected beam 8 of mirror 7 is of lesser intensity and serves as a comparison signal. The reflected or comparison light beam 8 is received by comparison photoelectric cell 34 and provided to conductor 11. The signal in conductor 11 may hereinafter be called Signal D.

Mirror 7 is provided with a thin reflective coating, advantageously to provide a small portion of the light beam from light source 1 as comparison ray 8 to photocell 34. The major portion of the light beam of light source 1 is passed through cuvette 3.

With regard to null comparison the light beam of mercury lamp 1 is applied to photoelectric cell 31, after passage through a cuvette 3 containing a test solution, as shown in FIG. 1. As noted above,, the signal from photoelectric cell 31 will be termed Signal C and deemed to occupy the main channel of the circuitry while the signal from photocell 34 in the comparison channel will be termed Signal D.

The Signal C is provided to regulating path amplifier 32 which is controlled by balance logic 33. The output of photoelectric cell 34 is Signal D and is passed to the input of a second regulating path amplifier 35. This amplifier is also controlled by balance logic 33.

The two amplifiers 32 and 35 initially provide a low degree of amplification and deliver small voltages. Through the closing of switch 36 connected to balance logic 33, a counter, not shown, inside balance logic 33 will be started, which raises the amplification provided by the two amplifiers 32 and 35 in coarse steps, up to a maximum of sixteen steps.

This increase in amplification may be accomplished, for example, by means of a field effect transistor positioned in the feedback path of the amplifier and initially having a low resistance. The steps of the counter inside balance logic 33 may be employed to change the voltage on the field effect transistor and hence provide a step wise increase in the resistance of the transistor, the amplification of the amplifier, and the amplifier output voltage.

A comparator is coupled to the output 45, 46 of the circuitry and to the two voltage signals C and D and stops the coarse amplifier regulation as soon as the voltages have been brought within the fine regulating range. The Signal C of the test channel has from the beginning a small advantage of amplification and is therefore somewhat larger than Signal D. It is self evident that the matter can also be reversed, it being only important that the voltage difference between the Signals C and D produced by the coarse regulation undergoes, by means of a fine regulator, a true and exact comparison.

The start of the fine regulation is initiated by comparator 37 which, by means of balance logic 33, starts binary counter 38 and digital-analog converter 39. These elements can finely regulate the signal magnitude in 212 steps, whereby the shift of a single step results at a frequency of 20 kilohertz, i.e., a time of 50 milliseconds. This frequency is provided by frequency generator 41 connected to binary counter 38.

The increase of signal D necessary for fine comparison of will be obtained by digital-analog converter 39 and. At its output, comparator 37 will compare the voltages C and D. When these voltages exactly agree, the comparison will stop and lamp 40 will be lit. This is an indication that the null comparison is reached and pressure switch 36 may be released. The entire comparison process during which switch 36 is operated may have a maximum duration on the order of two seconds.

increasing the available light, for example, as by test samples having no turbidity, permits faster coarse amplification adjustment and thereby, faster null comparison.

It is important that the balance logic 33 provide the necessary sequence of steps for coarse and fine balance. The binary counter 38 undertakes the digital storage, which remains after the resulting comparison so that in the binary counter the obtained result is recorded. The optical qualities of a blank solution may thus be stored in the apparatus so that the following test values may be automatically referenced to the stored blank value.

The comparison logic employs digital signals. To provide such signals the amplifier 32 and 35 are coupled to rectifiers 42 and 43 which rectify the output signals of the amplifiers and the output 45 of the circuitry which is compared by means of comparator 37 with the output of the digital-analog converter.

Figures 2, 3A, 3B:
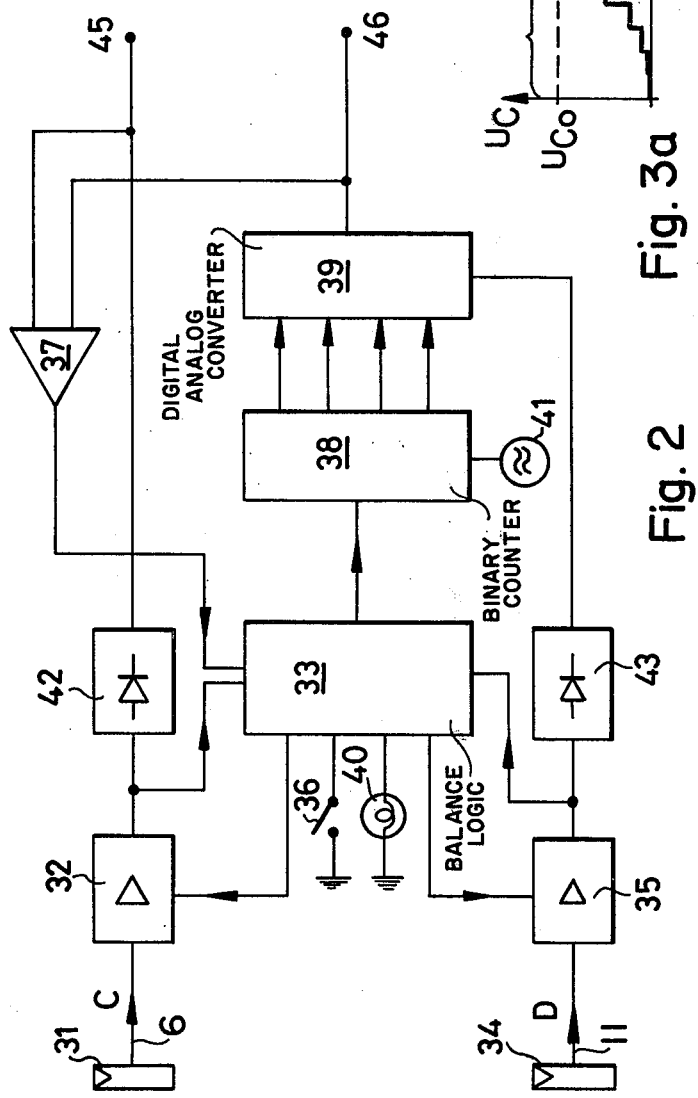
FIG. 2 is a simplified block diagram of the construction of the inventive null comparator.
FIGS. 3a and 3b are voltage traces with a comparison of Signals C and D of the measure and comparison channels.

FIGS. 3a and 3b show the voltage development of Signals C and D in the running of a null comparison.

In FIG. 3a the development of the test Signal C is shown, whereby the voltage $U_C$ through the coarse amplification will stepwise be raised. This coarse comparison is ended when the voltage takes on a value $U_{C0}$ which is sufficiently large for further measurement. FIG. 3b shows that the voltage $U_D$ of the comparison channel D likewise stepwise will be raised to a voltage $U_{D1}$ which is smaller than voltage $U_{C0}$. When this voltage is reached, the fine comparison is set, which in a maximum of $2^{12}$ steps raises the voltage $U_{D1}$ to the voltage $U_{D0}$, so that voltage $U_{D0}$ obtains the level of voltage $U_{40}$. Comparator 37 then terminates the coarse and fine balance.

Various modes of carrying out the invention are contemplated as being within the scope of the following claims particularly pointing out and distinctly claiming the subject matter which is regarded as the invention.

We claim:

1. Circuitry for the automatic nulling of a photometer comprising:
    test signal means for providing a first signal in accordance with the light transmission properties of a test sample;
    comparison signal means for providing a second signal in accordance with a comparison light beam;
    a first amplifier of controllable amplification coupled to said test signal means for amplifying said first signal;
    a second amplifier of controllable amplification coupled to said comparison signal means for amplifying said second signal;
    logic means coupled to said amplifiers for altering the amplification thereof in a first predetermined stepwise manner for amplifying the difference between said first and second signals;
    signal magnitude adjustment means interposed at the output of one of said amplifiers and receiving one of said signals for altering its magnitude in a second predetermined stepwise fashion into equality with the other of said signals; and
    a comparator for receiving said first and second signals and for providing an output indicative of the magnitudinal difference between them.

2. The circuitry of claim 1 wherein the amplifier for said one of said signals has a lower level of amplification than the amplifier for the other of said signals.

3. The circuit of claim 1 wherein said logic means is further defined interposed between said comparator and said signal magnitude adjustment means for bringing the latter into operation when said comparator senses a predetermined signal magnitude.

4. The circuitry of claim 1 wherein said logic means provides a coarse stepwise alteration of the amplification of said first and second amplifiers and said signal adjustment means provides a fine stepwise alteration of the signal magnitude of one of said signals.

5. The circuitry of claim 4 wherein said logic means includes a counter programmed to provide said amplification alteration.

6. The circuitry of claim 1 wherein said signal adjustment means includes a frequency generator providing digital output signals and a digital-analog converter operable by said frequency generator for incrementally altering the magnitude of said one signal responsive to said digital output signals.

7. The circuitry of claim 1 wherein said signal adjustment means includes counting means interposed between said frequency generator and said digital-analog converter for recording the magnitude of signal adjustment necessary to produce signal equality thereby to provide an indication of the light transmission properties of the test sample.

8. The circuitry of claim 1 wherein said signal adjustment means receives said second signal.

9. The circuitry of claim 1 including means coupled to said first and second amplifiers for converting said first and second signals to unipolarity form.

* * * * *

UNITED STATES PATENT AND TRADEMARK OFFICE
CERTIFICATE OF CORRECTION

PATENT NO. : 3,879,135
DATED : April 22, 1975
INVENTOR(S) : Bruno Egli, et al

It is certified that error appears in the above-identified patent and that said Letters Patent are hereby corrected as shown below:

| | | |
|---|---|---|
| Col. 1 | line 8 | delete "for providing a" |
| Col. 1 | line 9 | delete "digital indication of the light absorption" |
| Col. 3 | line 55 | delete "212" and substitute therefor ---$2^{12}$--- |
| Col. 3 | line 60 | after "son" delete "of" |
| Col. 3 | line 60 | after "39" insert a period --- . --- |
| Col. 3, | line 61 | delete "and." |
| Col. 4, | line 33 | delete "$U_{40}$" and substitute therefor ---$U_{CO}$--- |

Signed and Sealed this ninth Day of December 1975

[SEAL]

Attest:

RUTH C. MASON
*Attesting Officer*

C. MARSHALL DANN
*Commissioner of Patents and Trademarks*